US011516431B2

(12) United States Patent
Rey et al.

(10) Patent No.: US 11,516,431 B2
(45) Date of Patent: Nov. 29, 2022

(54) MEETING PRIVACY PROTECTION SYSTEM

(71) Applicant: Microsoft Technology Licensing, LLC, Redmond, WA (US)

(72) Inventors: Romain Gabriel Paul Rey, Vancouver (CA); Alexander James Wilson, Seattle, WA (US); Tom Neckermann, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 16/943,249

(22) Filed: Jul. 30, 2020

(65) Prior Publication Data

US 2022/0036708 A1   Feb. 3, 2022

(51) Int. Cl.
| H04N 7/15 | (2006.01) |
| H04N 7/14 | (2006.01) |
| G06F 21/84 | (2013.01) |
| H04L 65/403 | (2022.01) |
| G06F 21/62 | (2013.01) |
| G06V 20/52 | (2022.01) |
| G06V 20/40 | (2022.01) |

(52) U.S. Cl.
CPC ......... *H04N 7/147* (2013.01); *G06F 21/6245* (2013.01); *G06F 21/84* (2013.01); *H04L 65/403* (2013.01); *H04N 7/15* (2013.01); *G06F 2221/032* (2013.01); *G06V 20/40* (2022.01); *G06V 20/44* (2022.01); *G06V 20/52* (2022.01)

(58) Field of Classification Search
None
See application file for complete search history.

(56) References Cited

U.S. PATENT DOCUMENTS

| 7,783,075 | B2 | 8/2010 | Zhang et al. | |
| 7,881,446 | B1 * | 2/2011 | Apple | H04M 15/08 |
| | | | | 379/127.05 |
| 8,243,116 | B2 | 8/2012 | Qvarfordt et al. | |
| 8,577,001 | B2 * | 11/2013 | Orr | H04M 3/382 |
| | | | | 379/142.05 |
| 9,063,850 | B2 | 7/2015 | Higgs | |
| 9,247,204 | B1 | 1/2016 | Yin et al. | |
| 9,990,683 | B2 * | 6/2018 | Sidler | G06Q 50/265 |
| 10,311,249 | B2 | 6/2019 | Sharifi et al. | |

(Continued)

FOREIGN PATENT DOCUMENTS

WO       2017129804 A1    8/2017

OTHER PUBLICATIONS

"Articom", Retrieved from: https://www.agora.io/en/partners/articom/, Retrieved Date: Jul. 17, 2020, 4 Pages.

(Continued)

*Primary Examiner* — Quoc D Tran
(74) *Attorney, Agent, or Firm* — Christopher J. Volkmann; Kelly, Holt & Christenson, PLLC

(57) ABSTRACT

An intrusion detection system detects when an unexpected person enters the environment of a user who is in a meeting. A privacy protection action which is an action that is to be taken in response to the detected intrusion, is identified. Audio and/or video systems are then controlled to perform the privacy protection action. Machine learning can be used, based upon user interactions, to improve intrusion detection and other parts of the system.

20 Claims, 10 Drawing Sheets

(56) References Cited

U.S. PATENT DOCUMENTS

| | | | |
|---|---|---|---|
| 10,311,251 B2 | 6/2019 | Singh et al. | |
| 10,880,735 B2* | 12/2020 | Gill | G06V 20/20 |
| 2010/0111274 A1* | 5/2010 | Bayne | H04M 15/08 |
| | | | 379/202.01 |
| 2015/0040238 A1* | 2/2015 | Sarsa Sarsa | H04L 29/12283 |
| | | | 726/26 |
| 2016/0267268 A1 | 9/2016 | Sheldon et al. | |
| 2019/0147175 A1* | 5/2019 | Varerkar | H04L 63/107 |
| | | | 726/26 |

OTHER PUBLICATIONS

"Use of AI in Online Content Moderation", Retrieved from: https://web.archive.org/web/20190722150455/https:/www.ofcom.org.uk/__data/assets/pdf_file/0028/157249/cambridge-consultants-ai-content-moderation.pdf, Jul. 22, 2019, 84 Pages.

Huang, et al., "Temporally Coherent Completion of Dynamic Video". In Journal of ACM Transactions on Graphics, Dec. 5, 2016, 11 Pages.

Livingstone, Sonia, "Hidden in Plain Sight: Safety Innovation in Live-Streamed Video", Retrieved from: https://blogs.lse.ac.uk/parenting4digitalfuture/2019/04/24/hidden-in-plain-sight-safety-innovation-in-live-streamed-video/, Apr. 24, 2019, 14 Pages.

Zmolikova, et al., "Speaker-aware Neural Network based Beamformer for Speaker Extraction in Speech Mixtures", In Proceedings of 18th Annual Conference of the International Speech Communication Association, Aug. 20, 2017, pp. 2655-2659.

"International Search Report and Written Opinion Issued in PCT Application No. PCT/US2021/030759", dated Jul. 21, 2021, 12 Pages.

\* cited by examiner

MEETING PRIVACY PROTECTION SYSTEM

BACKGROUND

Computing systems are currently in wide use. Some such computing systems host services or applications that allow users to communicate with one another through meetings, video conferences, teleconferences, etc. These types of systems can be based on a cloud-based peer-to-peer software platform, a platform as a service, or a wide variety of other platforms.

These types of systems enable users to conduct professional or work meetings from a wide variety of different locations. For instance, work meetings can be conducted from home, from vacation facilities, or from public areas, such as libraries, or elsewhere.

This can compromise privacy. For instance, when workers are conducting meetings from home, children or other persons can often enter the room (or other environment of the meeting) during the meeting. This can ultimately result in privacy leaks and exposure of personal information. It can also introduce distractions into the meeting setting.

The discussion above is merely provided for general background information and is not intended to be used as an aid in determining the scope of the claimed subject matter.

SUMMARY

An intrusion detection system detects when an unexpected person enters the environment of a user who is in a meeting. A privacy protection action which is an action that is to be taken in response to the detected intrusion, is identified. Audio and/or video systems are then controlled to perform the privacy protection action. Machine learning can be used, based upon user interactions, to improve intrusion detection and other parts of the system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, many meeting platforms are available which allow users to attend a meeting from many different locations, using many different types of user devices. The meetings can be audio only (e.g., conference calls), audio visual, or even collaborative where documents can be shared and collaboratively worked on during the meeting. Thus, there is a potential for privacy leaks based upon the somewhat uncontrolled environments where users are conducting meetings. Even in a user's home, for instance, it may be that children or other people inadvertently enter the environment where the meeting is being held, and are thus shown, visually, or heard, audibly, in the meeting. Not only can this be a privacy concern, it can also be distracting to the user and other meeting attendees.

The present description thus proceeds with respect to a privacy protection system which identifies people (visually, audibly, or otherwise) who are not intended to be in the meeting. The present system identifies a privacy protection action that is to be taken (such as turning off a user's camera, muting the user's microphone, blurring images in the video, removing unwanted objects from the video, etc.) and performs those actions. The system can be automatically activated (such as based on a location of the meeting, a network over which the meeting is being conducted, meeting attendees, etc.) or it can be manually activated. The system can also detect user interactions and perform machine learning based upon those user interactions, to improve intrusion detection, to improve the decision for taking privacy protection actions, among other things.

Figure 1:
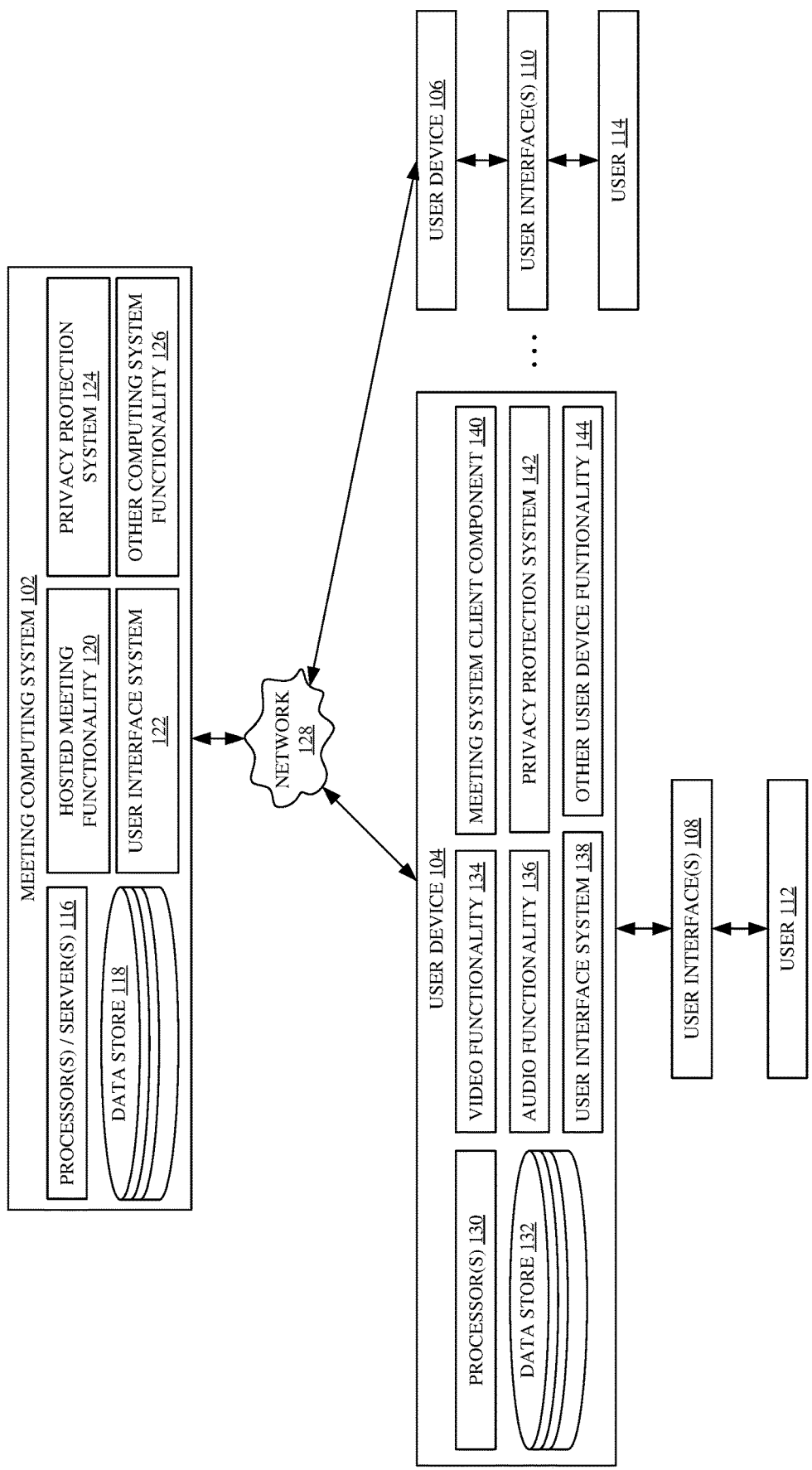
FIG. 1 is a block diagram of one example of a computing system architecture.

FIG. 1 is a block diagram showing one example of a computing system architecture 100. Architecture 100 includes meeting computing system 102, which provides a platform for conducting a meeting. System 102 is shown being accessed by a plurality of different user devices 104-106 which generate interfaces 108-110, for interaction by users 112-114, respectively. User 112 can interact with user interfaces 108 in order to control and manipulate user device 104 and some portions of meeting computing system 102. Similarly, user 114 can interact with user interfaces 110 in order to control and manipulate user device 106 and some portions of meeting computing system 102. In one example, meeting computing system 102 provides a platform by which users 112 and 114 can engage in a meetings, using user devices 104 and 106.

Before describing the operation of architecture 100, in more detail, a brief description of some of the items in architecture 100, and their operation, will first be provided. Meeting computing system 102 illustratively includes one or more processors or servers 116, data store 118, hosted meeting functionality 120, user interface system 122, privacy protection system 124, and it can include a wide variety of other computing system functionality 126. Hosted meeting functionality 120 controls user interface system 122 to expose an interface with which user devices 104 and 106 can interact, in accessing system 102. This can be done over a network 128. Therefore, network 128 can be a local area network, a wide area network, a near field communication network, a cellular communication network, or any of a wide variety of other networks or combinations of networks.

User devices 104 and 106 may be similar or different. For purposes of the present discussion, it is assumed that they are similar so that only user device 104 is described in more detail. In the example shown in FIG. 1, user device 104 illustratively includes one or more processors 130, data store 132, video functionality 134, audio functionality 136, user interface system 138, meeting system client component 140, privacy protection system 142, and a wide variety of other user device functionality 144. Video functionality 134 can include a camera, a display screen, and any of a wide variety of other video items. Audio functionality 136 can include a microphone and speaker, as well as other audio items. User interface system 138 is illustratively used by video functionality 134 and audio functionality 136 to generate user interfaces 108 so that user 112 can conduct a meeting with user 114. Meeting system client component 140 can be a client component (or application) of the hosted meeting functionality 120 on meeting computing system 102 or a stand-alone component. The meeting system client component 140 can receive audio and/or visual information from functionality 136 and 134, respectively, and generate meeting data that can be shared (such as by streaming or otherwise) with systems 102 and/or 106 so user 112 can be seen and/or be heard by user 114 during the meeting. Therefore, component 140 can handle interactions with hosted meeting functionality 120 in conducting a meeting in which user devices 104 and 106 are used to present an audio and/or visual and/or collaborative interface to the corresponding users, to conduct a meeting.

It will be noted that privacy protection system 142 and privacy protection system 124 can be the same or different systems. Similarly, some of the privacy protection functions can be distributed so that some are performed on privacy protection system 142 on user device 104 while other functions are performed on privacy protection system 124 on meeting computing system 102.

The privacy protection systems 124 and/or 142 are illustratively configurable so that they can be activated automatically, or manually. In one example, systems 124 and/or 142 are configured to identify intrusion events in which, during a meeting, an unexpected person or object is perceptible in the meeting. This may be that an unexpected person enters the room and comes into the view of the camera of a participant (user 112) in the meeting, or that an unintended person's voice is captured by the microphone of a participant in a meeting, or that another object becomes perceptible visually, audibly, or in other ways.

Once an intrusion event is detected, the privacy protection system 124 and/or 142 then determines an action to take based upon the detected intrusion event. In one example, an indication of the intrusion event can be surfaced for the user 112 and the user 112 can actuate a user interface element in order to take a privacy protection action (such as to mute the user's microphone, to disable the user's camera, etc.). In another example, the privacy protection system 124 and/or 142, itself, can automatically take a privacy protection action, such as disabling the microphone or camera of a user, blurring out or otherwise removing portions of the video signal and/or the audio signal, etc.

Systems 124 and/or 142 also illustratively have a machine learning system deployed therein. Based upon user interactions, the machine learning system can improve intrusion detection and action identification. For instance, if the system detects an intrusion event and automatically disables the user's camera, the system may also display a user interface element that can be actuated by the user to reverse that action and re-enable the user's camera. When this is done immediately after the intrusion event is detected and the action is taken, the machine learning system may determine that this was an erroneous intrusion detection, because the user immediately reversed the privacy protection action. This type of user interaction can be used by the machine learning system to improve the machine learning detection, to improve the ways in which privacy protection actions are identified, among other things.

Figure 2:
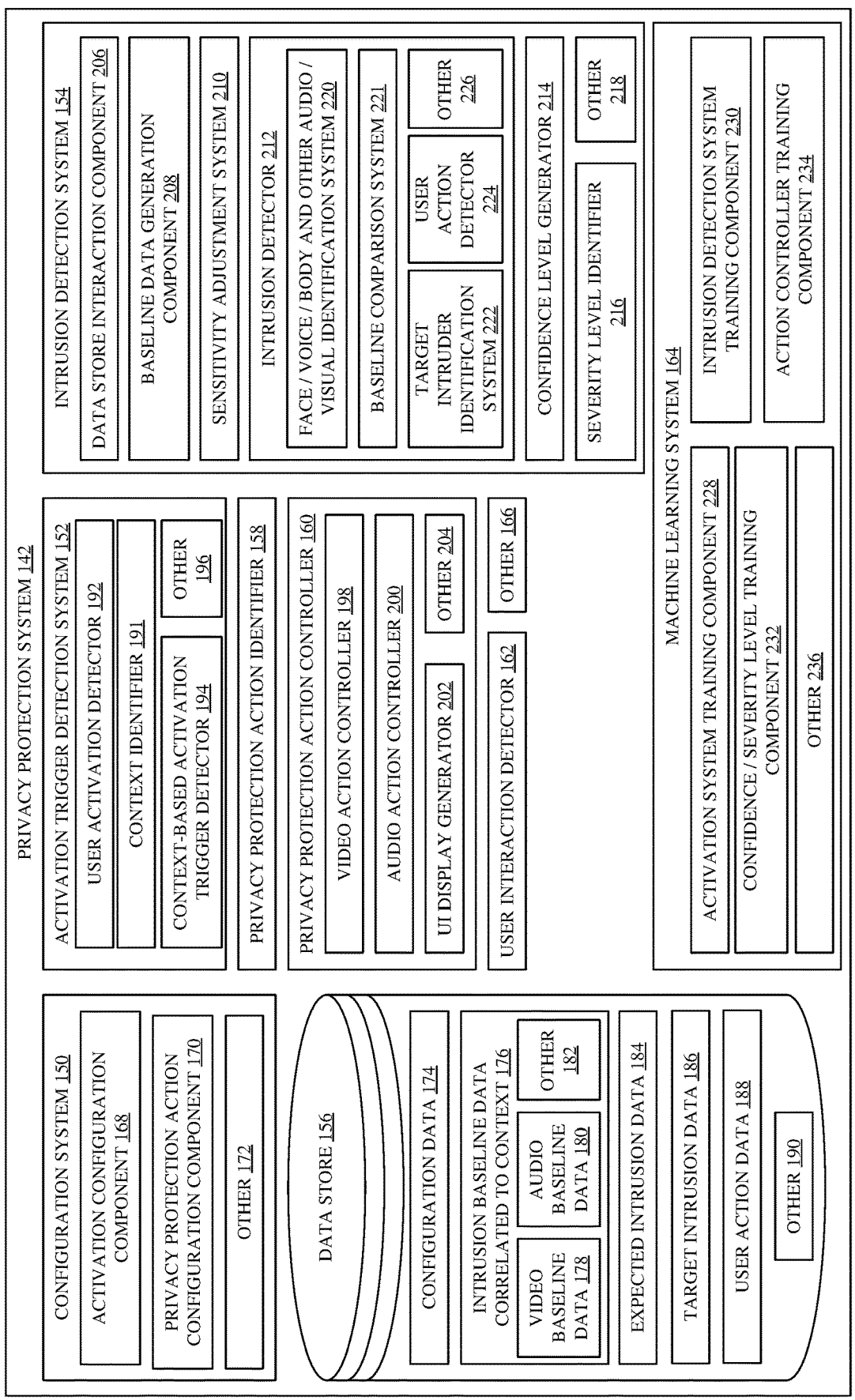
FIG. 2 is a block diagram showing one example of a privacy protection system, in more detail.

FIG. 2 is a block diagram showing one example of a privacy protection system, in more detail. For purposes of the present description, the privacy protection system shown in FIG. 2 is a privacy protection system 142. However, it will be appreciated that it could also be privacy protection system 124. Further, it will be appreciated that some functionality shown in FIG. 2 can be distributed in that it may be performed either in system 142 or in system 124, while other functionality is performed on both systems. These and other configurations and architectures are contemplated herein.

FIG. 2 is a block diagram showing one example of privacy protection system 142 in more detail. In the example shown in FIG. 2, system 142 includes configuration system 150, privacy mode activation trigger detection system 152, intrusion detection system 154, data store 156, privacy protection action identifier 158, privacy protection action controller 160, user interaction detector 162, machine learning system 164, and it can include other items 166. Configuration system 150, itself, can include activation configuration component 168, privacy protection action configuration component 170, and it can include other items 172. Data store 156 can include configuration data 174, intrusion baseline data 176 correlated to context (which, itself, can include video baseline data 178, audio baseline data 180 and other items 182), expected intrusion data 184, target intruder data 186, user action data 188, and it can include other items 190.

Privacy mode activation trigger detection system 152 can, itself, include user activation detector 192, context-based activation trigger detector 194, and it can include other items 196. Privacy protection action controller 160 illustratively includes video action controller 198, audio action controller 200, UI display generator 202, and it can include other items 204.

Intrusion detection system 154 illustratively includes data store interaction component 206, baseline data generation component 208, sensitivity adjustment system 210, intrusion detector 212, confidence level generator 214, severity level identifier 216, and it can include other items 218. Intrusion detector 212 can include face/voice/body identification system 220, target intruder identification system 222, user action detector 224, and it can include other items 226.

Machine learning system 164 can, itself, include activation system training component 228, intrusion detection system training component 230, confidence/severity level training component 232, action controller training component 234, and it can include other items 236. Before describing the operation of privacy protection system 142 in more detail, a brief description of some of the items in system 142, and their operation, will first be provided.

Configuration system 150 can be used to configure privacy protection system 142. For instance, system 142 can be configured with criteria that can be used to determine when to automatically activate privacy protection system 142 (e.g., when a meeting starts, when a certain type of meeting starts, in a certain context, etc.). It can also be used to configure system 142 with baseline information. For instance, a user may have recorded a number of prior meetings. In that case, the prior meetings can be accessed (e.g., by baseline data generation component 208) so that system 142 learns what the user's face looks like, learns the type of visual information that is normally present during a meeting, learns what the user's voice sounds like, and the types of audio information that are present during meetings.

By way of example, it may be that the user normally has meetings in a relatively dark office. In that case, the background baseline information would indicate that the background is normally dark, and the user's face could be recognized as baseline information. However, it may be that the user normally has meetings in an office where the camera is facing a window behind the user. In that case, it may be that coworkers or other people walk behind the user so that the baseline video information includes people moving past the camera behind the user. Configuration system 150 allows privacy protection system 142 to be configured to access recorded meetings or other historic information to obtain this type of audio and visual baseline information.

Configuration system 150 can also be used to configure system 142 to take certain types of actions, when an intrusion event is detected. System 150 can be used to configure system 144 to generate other configuration information as well.

Activation configuration component 168 can be used to configure privacy mode activation trigger detection system 152. For instance, it may be that system 152 is only to activate system 142 based on a manual user actuation input. In that case, activation configuration component 168 can configure system 152 to only react to a trigger when a user provides an input activating system 142. It may also be that system 142 is activated automatically. In that case, component 168 can generate configuration information indicating the contexts or other triggers that will be used to automatically activate system 142. For instance, when a user attends a meeting, the context of that meeting may indicate that system 142 should be activated. As an example, if the geographic location of the user device that the user is using to attend the meeting indicates that the user is at home, but the meeting invitation indicates that the meeting is a work-related meeting, then this type of context may indicate that privacy protection system 142 should be activated during that meeting. The location of the user device 104 may be identified based upon the WIFI network SSID, the VPN connection information, or the geographic location of the user device. Similarly, the location of the user device 104 can be derived or inferred from other information, such as schedule information for the user indicating that the meeting is being held during work hours. The context information may include meeting attendees. If those attendees are identified as coworkers of the user, this may indicate that the meeting is a work meeting and that the user is attending from home. This type of context may also indicate that the system 142 should be automatically activated. Other context information can also be used as a trigger in order to automatically activate privacy protection system 142. Configuration system 150 can also include privacy protection action configuration component 170. Component 170 generates configuration information which indicates the type of privacy protection actions which are to be taken when different intrusion events are detected. The configuration information that determines what type of privacy protection action to take may be default information, or it may be automatically generated or machine learned information as well. Similarly, a user may indicate what type of privacy protection actions are to be taken under different circumstances. Thus, component 170 can generate the configuration information based on user inputs or busing other types of automated processes.

Privacy mode activation trigger detection system 152 detects an activation trigger indicating that system 142 is to be activated. User action detector 192 detects a manual user input activating system 142. For instance, there may be a user actuatable element that is displayed on a user interface display when a user begins to attend a meeting. This element may allow the user to turn on or off system 142.

Context identifier 191 illustratively accesses the functionality needed to identify context information that is to be used as an activation trigger. For example, context identifier 191 can access a position sensing system that senses a geographic location of the user device being used for the meeting. Context identifier 191 can access the user's calendar and profile information to see the meeting attendees, the user's normal work hours, the subject matter of the meeting, the VPN connection information, SSID information, etc.

Context-based activation trigger detector 194 detects the context of the meeting, and determines, where automated activation is be performed, whether system 142 is to be automatically activated based upon the meeting context. Again, the context information can be identified by context identifier 191 and can include the location from which the user is attending the meeting, the other attendees of the meeting, the subject matter of the meeting (e.g., whether it is work related or private subject matter), the time of day during which the meeting occurs, or other context information. By automatically, it is meant for example that the action is performed without further manual involvement, except, perhaps to initiate or authorize it.

Intrusion detection system 154 receives the audio and visual streaming information for the meeting, and processes it to detect whether an intrusion event occurs. Data store interaction component 206 illustratively interacts with data store 156 to obtain various items of configuration data 174, baseline data 176, expected intrusion data 184, target intrusion data 186, user action data 188, and other data 190. Baseline data generation component 208 can obtain baseline data 176 for use in comparing the current audio and visual streaming data from the current meeting, against the baseline data. Component 208 can also generate baseline data from the current meeting from prior meetings, or from other sources. For instance, it may be that no baseline data exists, or that very limited baseline data exists for a meeting that is in the same or similar context as the current meeting (e.g., the same location of the user, the same attendees, etc.). In that case, whatever baseline data is available can be used for intrusion detection, and baseline data generation component 208 can also begin generating baseline data for the current meeting. For instance, component 208 can generate baseline audio and visual data for the current meeting that identifies what is normal for the user's voice, the user's face, the audio and visual background of the user, etc. This information can then be used by intrusion detector 212 in detecting an intrusion.

Sensitivity adjustment system 210 can be used to increase the sensitivity of intrusion detector 212, where desired. For instance, it may be that the user is attending a weekly recurring meeting. It may also be that an intrusion is normally detected at a certain point in time during the weekly recurring meeting. In that case, this pattern can be identified by sensitivity adjustment system 210. System 210 can then increase the sensitivity of intrusion detector 212 (or increase the confidence level with which an intrusion is detected) during that time of the meeting. Sensitivity adjustments can be made in other ways as well.

During the meeting, intrusion detector 212 processes the audio and visual data from the meeting to identify or detect intrusions. Face/voice/body (and other audio/visual) identification system 220 can identify intrusions using face detection, voice detection, and body movement detection, along with other audio and visual detection mechanisms. For instance, if the baseline information indicates that only the user's face is normally present, then if system 220 identifies a different face in the video information, this may indicate that an intrusion event has just occurred. The same is true of the audio information. If the user's voice is the only voice normally occurring during the current meeting, then system 220 can detect an intrusion event when another person's voice (e.g., a baby crying, people talking the background, etc.) is detected in the streaming audio data for the current meeting. System 220 can also identify different body movements of the user, from which an intrusion event can be inferred. For instance, if the user's child enters the room crawling (so that the user's child is not visible), but the user bends down to pick something up off the floor, this may indicate that an intrusion event is occurring. Similarly, if the user turns his or her face away from the camera and begins talking, this may indicate that an intrusion event is occurring as well.

Baseline comparison system 221 compares the faces, voice, body movements, background, etc., identified by identification system 220 against the audio, visual and other baseline information. If the identified items are different from those found in the baseline information, by a threshold amount, the comparison system 221 may generate an output indicating that an intrusion event is occurring.

It may also be that, during meetings that the current user attends, there is often one particular person who is an intruder or one particular intrusion event that occurs. For instance, it may be that a user's child or spouse often enters the room while the user is attending a meeting. In that case, target intruder data 186 in data store 156 may provide a pre-existing identity of the face or voice of the common intruder. Thus, once the system identifies the face or voice of the common intruder during the meeting, an intrusion event can be raised without further processing. In that case, there need not be any comparison against background or baseline information, because it is known, ahead of time, that if the face or voice of the common intruder is recognized during a meeting, then an intrusion event is occurring.

User action detector 224 can compare the user actions in the streaming video data for the current meeting against the user action data 188 that indicates an intrusion event is occurring. Again, this may be the user turning his or her face away from the camera, the user bending down or going out of the camera view, among other things.

Assuming an intrusion event is detected by intrusion detector 212, confidence level generator 214 then illustratively generates a confidence indicator, indicating how confident intrusion detection system 154 is that an intrusion event is actually occurring. For instance, if an intrusion event is detected by baseline comparison system 221 based on the fact that a very loud crying baby is detected, and this is abnormal given the baseline audio data, then the confidence level that an intrusion event is occurring may be relatively high. However, if system 221 detects an intrusion based upon relatively low level audio conversation going on in the background, this may be assigned a relatively low confidence level.

Severity level identifier 216 can generate a severity level indicator identifying the severity level corresponding to the detected intrusion. For instance, if the baseline information indicates that normally only the user's face is visible, but the face and voice of a second person become visible and audible in the streaming meeting data, then this may be a relatively severe intrusion. However, if the intrusion is detected based upon only a low level, audible voice in the background, where it is unlikely that the speaker's identity can be identified, then this may be a relatively low level intrusion. Similarly, if the intrusion causes the meeting attendee to leave the camera view or become inaudible, then the intrusion may be relatively high level. The severity level of the intrusion can be identified in other ways as well, and these are only examples.

Privacy protection action identifier 158 receives an indication from intrusion detection system 154 that an intrusion event has been detected. It can also receive a confidence level and severity level corresponding to that intrusion event. Action identifier 158 then identifies the particular privacy protection action that will be taken based upon the intrusion event, its confidence level and severity level. Identifier 158 provides an indication of the identified action to privacy protection action controller 160.

Controller 160 then carries out the privacy protection action that is identified by identifier 158. Video action controller 198 can control the video system (e.g., camera, image capture device, etc.) to carry out the privacy protection action. This may include turning off the video camera, otherwise disabling video transmission, blurring or blocking out a portion of the video image, compensating the video image to remove the intruder's image and replace it, directing a camera away from the intruder, or other actions. Audio action controller 200 controls the audio information (such as the microphone) to perform a privacy protection action. This may include cutting the microphone, otherwise disabling audio transmission, isolating only the user's voice and blocking other audio information, re-directing a directional microphone away from the intruding audio source, among other things.

UI display generator 202 can generate a display element that the user can interact with. For instance, it may be that system 142 is configured to only take the privacy protection action once it has been authorized by the user. In that case, UI display generator 202 can generate a UI display element that enables the user to quickly deactivate the camera, turn off the microphone, or simply invoke the "privacy mode" so that, once invoked, the privacy protection action can be automatically taken by the system. In addition, UI display generator 202 can generate a display element that allows the user to reverse or modify the privacy protection action. For instance, if system 142 automatically disables the camera, UI display generator 202 can illustratively generate a display element that can be actuated by the user to quickly re-enable the camera. The UI display element may include a message such as "Intrusion Event Detected, Camera Disabled". It may include a button with a label, such as "Re-enable Camera" or "Dismiss Intrusion Event", etc. If the user actuates the button, then the camera is automatically re-enabled.

User interaction detector 162 detects these types of user interactions and provides them to machine learning system 164. Based upon the user interactions, machine learning system 164 can perform machine learning to improve the operation of privacy protection system 142. Activation system training component 228 can, for instance, train the activation trigger detection system 152 based upon user interactions. By way of example, if trigger detection system 152 does not activate privacy protection system 142 when the user wishes, and the user manually activates it, then component 228 can examine the recent history (the meeting context, and other information), just prior to the user activating system 142, to retrain system 152 so that it is more likely to automatically activate system 142 in a similar context in the future.

Intrusion detection system training component 230 can train intrusion detection system 154 based on user interactions. If system 154 fails to identify an intrusion event, and the user manually invokes a privacy protection action, then intrusion detection system 154 can be retrained by component 230 so that it will more likely identify such an intrusion event in the future.

Confidence/security level training component 232 can train confidence level generator 214 and security level identifier 216. For instance, based upon user interactions, it may be clear that an intrusion event that was detected, was a false positive detection. By way of example, if the user immediately reverses the privacy protection action that was automatically taken by controller 160, this will tend to indicate that the intrusion event was false. In the same manner, if the user quickly invokes a privacy protection action, where no intrusion event was detected, this may indicate that the system missed an intrusion event that should have been detected. This information can be used in machine learning as well.

Action controller training component 234 can be used to train user action detector 224 based upon user interactions. For instance, a user's body movement may not be used to infer an intrusion event, when it should have been. In that case, when a user manually invokes a privacy protection action, indicating that an intrusion event is actually present, then action controller training component 234 can analyze the user's body movements just prior to the user manually invoking the privacy protection action, so that user action detector 224 will more likely identify those body movements as inferring an intrusion event, in the future.

Figure 3A:
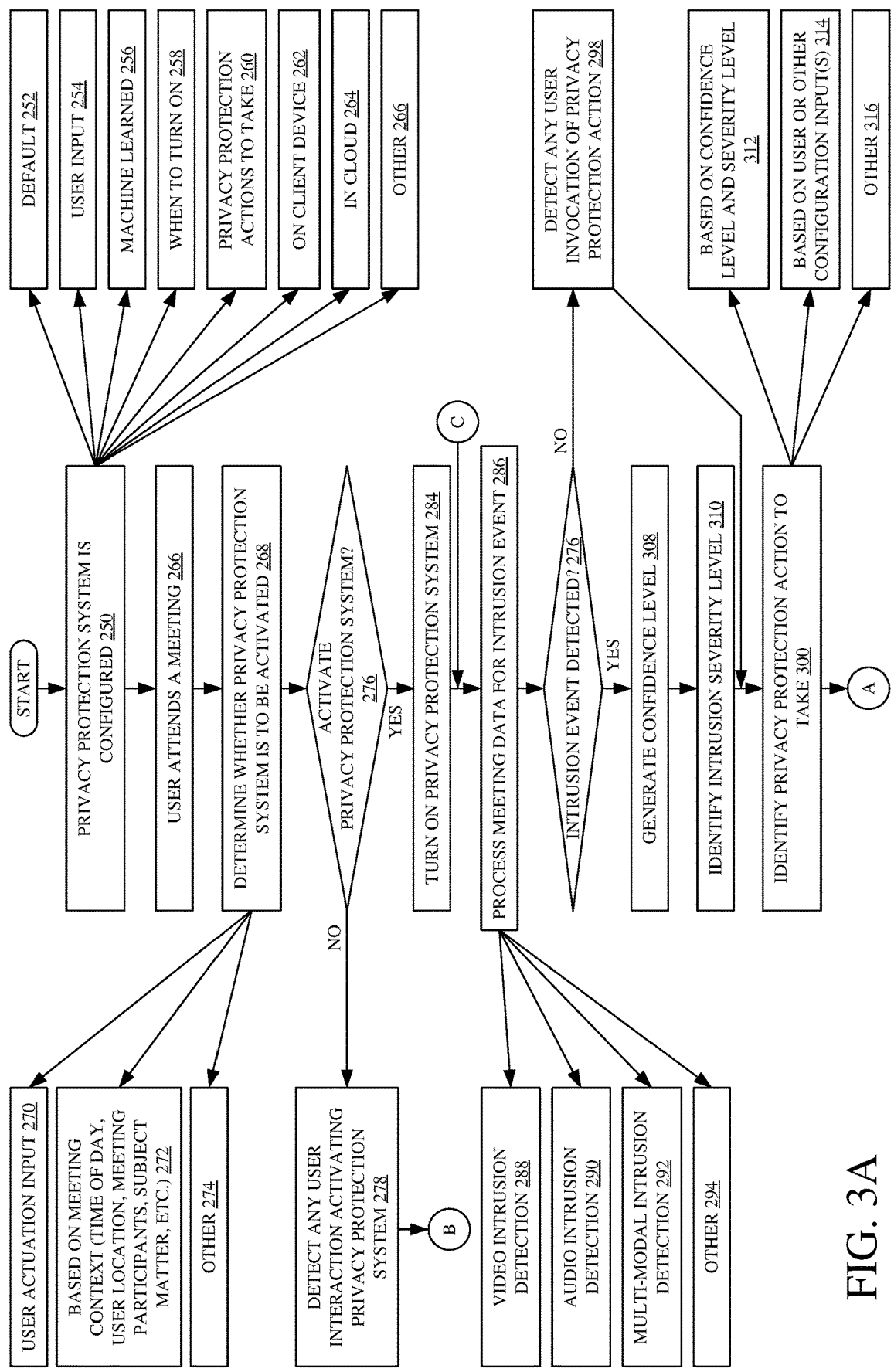
FIGS. 3A and 3B illustrate a flow diagram showing one example of the operation of the architecture illustrated in FIG. 1, in more detail.
Figure 3B:
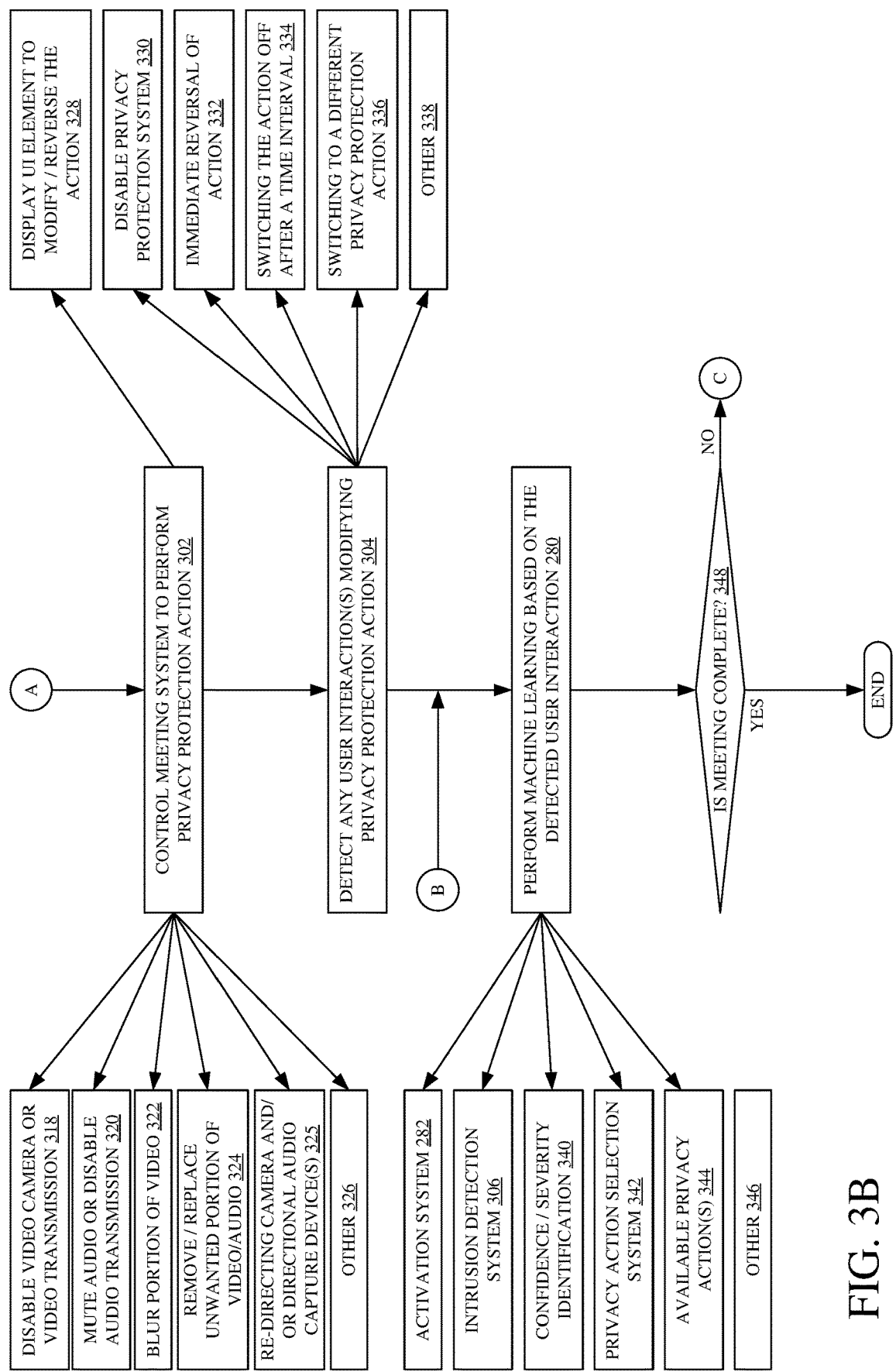

FIGS. 3A and 3B (collectively referred to herein as FIG. 3) show a flow diagram illustrating one example of the operation of privacy protection system 142 in identifying intrusion events and performing privacy protection actions. FIGS. 2 and 3 will now be described in conjunction with one another.

It is first assumed that the privacy protection system 142 is configured. This is indicated by block 250 in the flow diagram of FIG. 3. As discussed above, the configuration can be a default configuration 252 or a configuration based on user inputs 254. The configuration can be machine learned using machine learning system 164. This is indicated by block 256 in the flow diagram of FIG. 3. The configuration information can indicate when activation trigger detection system 152 is to turn privacy protection system 142 on. This is indicated by block 258. The configuration information can identify the privacy protection actions to take based on the different types of intrusion events that are detected. This is indicated by block 260. Again, as discussed above, privacy protection system 142 can be located on a client device, as indicated by block 262, or in the cloud, or distributed, as indicated by block 264. The system can be configured in other ways as well, and this is indicated by block 266.

At some point, user 112 will attend a meeting. This is indicated by block 266 in the flow diagram of FIG. 3. Privacy mode activation trigger detection system 152 then determines whether the privacy protection system is to be activated. This is indicated by block 268. For example, user 112 can manually activate privacy protection system 142. This is indicated by block 270. In another example, trigger detection system 152 can automatically detect activation triggers and activate privacy protection system 142. This is indicated by block 272. As discussed above, the triggers can be based on the time of day (e.g., when the user is normally at work), the user's location (as identified by the geographic location of user device 104, the VPN connection information, the WIFI network SSID, or other location information), the meeting participants (e.g., whether they are identified as coworkers of user 112 or personal friends of user 112), the subject matter of the meeting (e.g., whether it has been learned that this subject matter is normally involved in a work meeting or a personal meeting, etc.), or based on other context information. Context identifier 191 can obtain the context information and activation trigger detector 194 can determine whether to activate system 142 based on the context information. A determination as to whether to activate privacy protection system 142 can be made in other ways as well. This is indicated by block 274 in the flow diagram of FIG. 3.

If, at block 276, it is determined that privacy protection system 142 is not to be activated, then user interaction detector 162 continues to detect any user interaction in which user 112 may manually activate the privacy protection system 142. This is indicated by block 278 in the flow diagram of FIG. 3. For instance, it may be that system 142 is configured so that trigger detection system 152 is to automatically detect triggers and activate privacy protection system 142 under appropriate circumstances. In that case, it may be that trigger detection system 152 erroneously determined that privacy protection system 142 is not to be activated. In such a scenario, user 112 may then manually activate privacy protection system 142. In that case, user interaction detector 162 detects this and provides an indication of this to machine learning system 164. Machine learning system 164 can then perform machine learning to train the algorithms used by trigger detection system 152 and specifically context-based activation trigger detector 194, to identify the context in which user 112 just manually activated privacy protection system 142. Activation system training component 228 can further train trigger detector 194 so that it will more likely recognize this context in the future, as a context which indicates that privacy protection system 142 should be activated. Performing machine learning based on the detected user interaction is indicated by block 280 in the flow diagram of FIG. 3, and training the trigger detection system 152 based upon that user interaction is indicated by block 282 in the flow diagram of FIG. 3.

Returning to block 276 in FIG. 3, assume now that trigger detection system 152 has detected an activation trigger and has automatically activated privacy protection system 142. Turning on the privacy protection system 142 is indicated by block 284 in the flow diagram of FIG. 3. At that point, intrusion detection system 154 begins processing the streaming meeting data for intrusion events. This is indicated by block 286 in the flow diagram of FIG. 3, and it is described in greater detail below with respect to FIG. 4. Suffice it to say, at this point, that intrusion detection system 154 can process the streaming video data to detect an intrusion event using video intrusion detection is indicated by block 288. System 154 can also process the streaming audio data to detect an intrusion event. Audio intrusion detection is indicated by block 290 in the flow diagram of FIG. 3. System 154 can use both video and audio data for intrusion detection, and system 154 can use other modes of detection as well. Using a multi-modal intrusion detection mechanism is indicated by block 292 in the flow diagram of FIG. 3. The meeting data can be processed in other ways to detect intrusions, and this is indicated by block 294.

If, at block 296, intrusion detection system 154 has not detected an intrusion event, then user interaction detector 162 continues to monitor user interactions to determine whether user 112 manually invokes a privacy protection action (such as disabling his or her camera, microphone, etc.). In one example, UI display generator 202 in privacy protection action controller 160 displays, during the meeting, a user actuatable display element. User 112 can thus actuate that display element in order to quickly activate the intrusion mode, in which case privacy protection action identifier 158 will immediately identify a privacy protection action to take, and privacy protection action controller 160 will take that action. This is one way for user 112 to manually invoke a privacy protection action and others are contemplated herein as well.

Assume that, at block 298 in the flow diagram of FIG. 3, user 112 does manually invoke a privacy protection action. In that case, processing proceeds to block 300 where privacy protection action identifier 158 identifies the privacy protection action to take. This is described in greater detail below. Privacy protection action controller 160 then controls the meeting system to perform the identified privacy protection action. This is indicated by block 302 and is also described in greater detail below. The user may modify the privacy protection action which is taken, as indicated by block 304, and again processing continues at block 280 where machine learning system 164 can learn from the user interactions that have been detected in order to improve performance of system 142. For instance, intrusion detection system training component 230 can train intrusion detection system 154 so that it will more likely will identify an intrusion event, given similar streaming meeting data as that which preceded the user manually invoking a privacy protection action at block 298. Performing machine learning to improve the performance of the intrusion detection system is indicated by block 306 in the flow diagram of FIG. 3.

Returning again to block 296, assume now that intrusion detection system 154 has detected an intrusion event (again, this is described in greater detail below with respect to FIG. 4). In that case, confidence level generator 214 generates a confidence level that indicates the confidence with which system 154 has detected the intrusion event. Generating a confidence level is indicated by block 308 in the flow diagram of FIG. 3. Severity level identifier 216 then identifies an intrusion severity level. This is indicated by block 310. This information (an intrusion event identifier that identifies the type of intrusion event, the confidence level and the severity level) are provided to privacy protection action identifier 158. Identifier 158 identifies the privacy protection action to take based upon the received information. This is indicated by block 300. Privacy protection action identifier 158 can be a rules-based model, or another type of model, such as a classifier, neural network, Bayesian classifier, etc. which receives the input information and uses the rules or classifier to identify the particular privacy protection action that it is to take. Again, this determination can be based on the confidence level and severity level, as indicated by block 312 in the flow diagram of FIG. 3. It can be based on user or other configuration inputs identified by configuration data 174. This is indicated by block 314 in the flow diagram of FIG. 3. The privacy protection action can be identified in other ways as well, and this indicated by block 316.

Privacy protection action controller 160 then controls the meeting system to perform the identified privacy protection action, as indicated by block 302. There are a wide variety of different types of privacy protection actions that can be taken. For instance, video action controller 198 can disable the video camera or other image capture device or otherwise disable video transmission. This is indicated by block 318 in the flow diagram of FIG. 3. Audio action controller 200 can mute the microphone or other audio device, or otherwise disable audio transmission, as indicated by block 320. Video action controller 198 can also blur portions of the video as indicated by block 322. Video action controller 198 and audio action controller 200 can also remove unwanted portions of the video or audio data. This can be done by isolating a portion of the video or audio data that is the cause of the intrusion event, and removing it. In the case of video data, the average video data for that portion of the video frame, from frames prior to the intrusion event, can be used to replace the video data so that a viewer need not necessarily even know that the intrusion event occurred. Removing and/or replacing unwanted portions of the audio or video data is indicated by block 324 in the flow diagram of FIG. 3. Controllers 198 and 200 can re-direct the camera and/or a directional microphone away from the source of the intrusion event. This is indicated by block 325. The privacy protection action controller 160 can control the meeting system to perform other privacy protection actions as well, and this is indicated by block 326. Throughout this process, user interaction detector 162 continues to detect any user interactions which may modify the privacy protection action.

For instance, UI display generator 202 can also display a UI element that enables user 112 to easily modify the privacy protection action. This is indicated by block 328 in FIG. 3. The UI display element may, by way of example, allow user 112 to quickly re-enable the camera, to unmute the microphone, or to perform other modification actions as well.

These user interactions may indicate that the user wishes to perform a different privacy protection action, or wishes to reverse the privacy protection action (e.g., when an erroneous intrusion event was detected). Detecting the user interactions is indicated by block 304 in the flow diagram of FIG. 3. When the user provides an input to disable the privacy protection system 142, this information can be used to again train trigger detection system 152, and it is indicated by block 330 in the flow diagram of FIG. 3. When the user 112 provides an input to immediately reverse the privacy protection action, this can also be used to train privacy protection action identifier 180 and privacy protection action controller 160 Immediately reversing the action is indicated by block 332 in the flow diagram of FIG. 3.

In another example, user 112 may allow the privacy protection action to be enabled for a certain period of time (such as when the user removes a child from the meeting environment, etc.) until the intrusion event is no longer present. In that case, after a certain time period, the user may then switch the privacy protection action off. This is indicated by block 334. This information can also be used by machine learning system 164 to train elements of privacy protection system 142.

User 112 may also switch to a different privacy protection action (such as instead of only muting a microphone, also disabling the camera or vice versa). This is indicated by block 336 in the flow diagram of FIG. 3, and this information can also be used by machine learning system 164 to train elements of privacy protection system 142. Detecting user interactions can be done in other ways as well, and this is indicated by block 338.

Processing then continues at block 280 where machine learning system 164 can perform machine learning based upon the detected user interactions. As discussed above, activation system training component 228 can train the activation trigger detection system 152. Intrusion detection system training component 230 can train intrusion detection system 154. Confidence/severity level training component 232 can be used to train confidence level generator 214 and severity level identifier 216. This is indicated by block 340 in the flow diagram of FIG. 3. Action controller training component 234 can be used to train privacy protection action identifier 158 and controller 160. This is indicated by block 342. It can also be used to add additional privacy protection actions that may be identified and used by privacy protection system 142. This is indicated by block 344. Machine learning system 164 can perform other machine learning operations as well, and this is indicated by block 346.

Until the meeting is complete, as indicated by block 348, processing may then revert to block 286 where intrusion detection system 154 continues to process the streaming meeting data for intrusion events.

Figure 4:
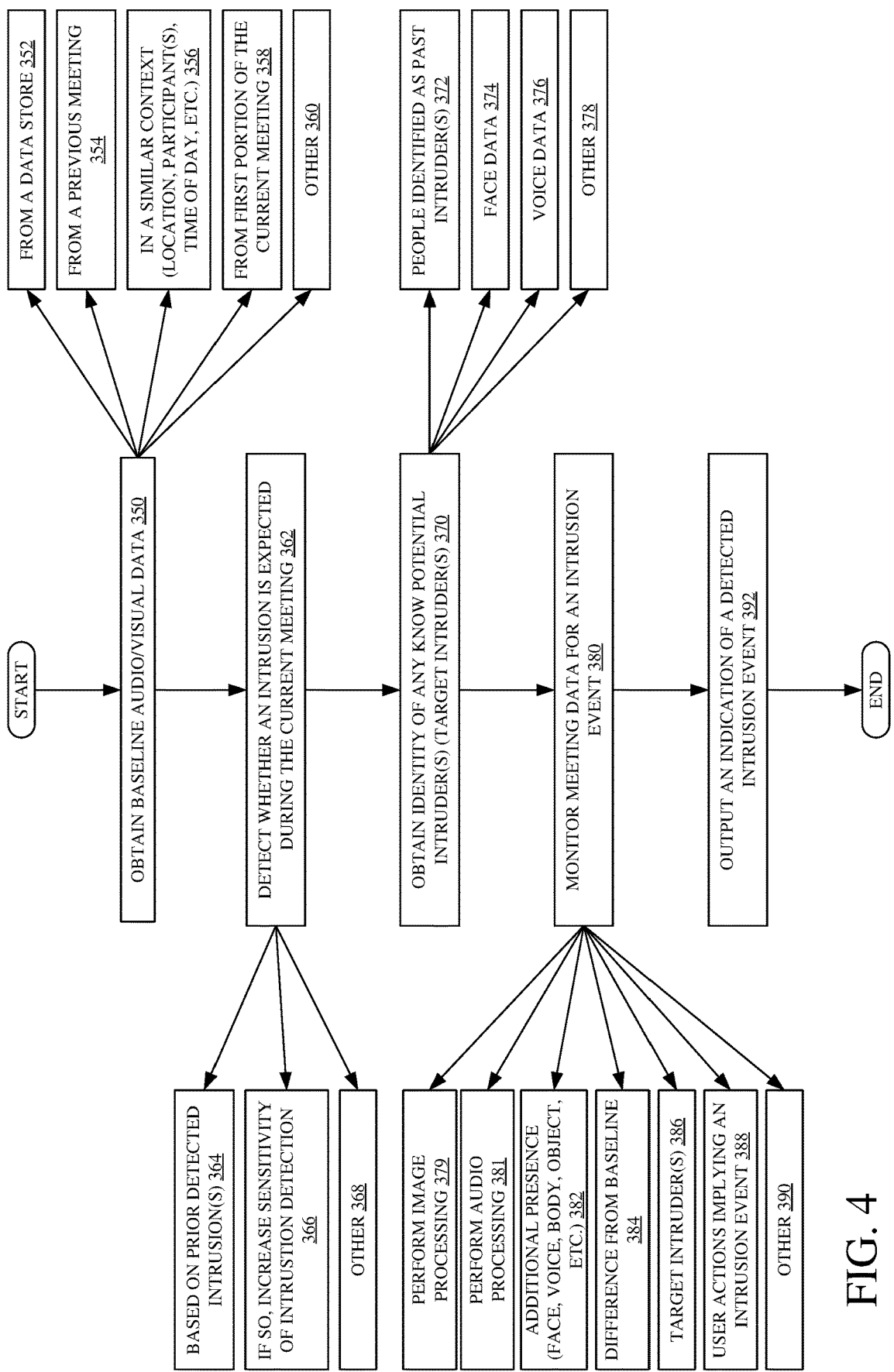
FIG. 4 is a flow diagram illustrating one example of the operation of the system in performing intrusion detection.

FIG. 4 is a flow diagram illustrating one example of the operation of intrusion detection system 154, in detecting intrusion events based upon the streaming meeting data, in more detail. It is first assumed that intrusion detection system 154 is monitoring the streaming audio and/or visual meeting data for a meeting that user 112 is attending. Data store interaction component 206 then obtains baseline audio/visual data. This is indicated by block 350 in the flow diagram of FIG. 4. In one example, baseline data has already been generated and stored in data store 156 as intrusion baseline data 176, correlated to context information. Obtaining the baseline data from the data store is indicated by block 352 in the flow diagram of FIG. 4.

It may be that baseline data generation component 208 has generated baseline data from prior meetings or other sources, correlated it to context under which it was generated, and stored in data store 156. Obtaining the baseline information from a previous meeting or other sources is indicated by block 354 in the flow diagram of FIG. 4. There may be a wide variety of different sets of baseline data stored in data store 156, all correlated to different contexts. In that case, data store interaction component 206 searches for baseline data with a current context (current time of day, current meeting attendees, current subject matter, current user location, etc.). It thus obtains baseline data with the most similar context.to the current meeting. This is indicated by block 356 in the flow diagram of FIG. 4.

When no preexisting baseline data is stored in data store 156, then baseline generation component 208 can generate baseline data from a first portion of the current meeting (such as from the first several minutes, etc.). In doing so, it can identify the faces of the attendees that appear in the meeting at that the user's location, background visual data, the voice of the attendees, background audio data, and it can establish a baseline for these and other categories of information. Obtaining the baseline data from a first portion of the current meeting is indicated by block 358 in the flow diagram of FIG. 4. The baseline data can be obtained in other ways as well, and this is indicated by block 360.

Sensitivity adjustment system 210 can also analyze the expected intrusion data 184 that is stored for meetings with a context that is similar to the current meeting. For instance, it may be that user 112 has a recurring meeting on this day of the week, at this time, and an intrusion event is always detected at approximately 10 minutes into the meeting (e.g., the user's children return from school at that time, etc.). In that case, this information can be stored in a log or otherwise correlated to the context information and stored in data store 156. Sensitivity adjustment system 210 can obtain that information and, beginning shortly before an expected intrusion, it can heighten the sensitivity of the intrusion detector 212, to look for a particular intrusion event around that time. Detecting whether an intrusion event is expected during the current meeting is indicated by block 362 in the flow diagram of FIG. 4. Detecting that based on a pattern of prior detected intrusions is indicated by block 364, and increasing the sensitivity of the intrusion detector 212, based upon an expected intrusion event, is indicated by block 366. Detecting whether an intrusion event is expected can be done in other ways as well, and this is indicated by block 368.

Target intruder identification system 222 can also obtain the identity of any expected intruders (or target intruders) so that intrusion detector 212 can specifically be looking for those intruders in the streaming meeting data. Obtaining the identity of any know potential intruders (or target intruders) is indicated by block 370 in the flow diagram of FIG. 4. The target intruders are illustratively people who have been identified as intruders in prior meetings. The identity of the target intruders can be correlated to context data as well. Therefore, if a particular person often intrudes in a recurring meeting, that person may be identified (if the intrusion is sufficiently frequent) as a target intruder. If intrusion detector 212 identifies that person, in the streaming data for the current meeting (either the audio or visual data) then intrusion detector 212 can immediately conclude that an intrusion event has occurred, without comparison against any other baseline data. Identifying the target intruders as people who have caused intrusion events in prior meetings is indicated by block 372. Identifying the target intruders based on facial recognition data is indicated by block 374 and identifying target intruders based on voice recognition data is indicated by block 376. The target intruders can be identified in other ways as well, and this is indicated by block 378.

Once intrusion detection system 154 has obtained these types of information, then intrusion detector 212 monitors the meeting data for an intrusion event. This is indicated by block 380 in the flow diagram of FIG. 4. Intrusion detector 212 can perform image processing 379 and audio processing 381 on the streaming meeting data. In doing so, face/voice/body (and other audio/visual) identification system 220 can determine the presence of an additional person in the meeting, other than those found in the baseline information. This can be done using face recognition, voice recognition, body detection, etc. System 200 can also identify objects or other sources of intrusion events. This is indicated by block 382 in the flow diagram of FIG. 4. Comparing the audio and visual data from the meeting against baseline data to detect an intrusion event is indicated by block 384. Detecting the presence of target intruders is indicated by block 386 and identifying user actions that imply an intrusion event is indicated by block 388. Intrusion detector 212 can monitor the streaming meeting data in other ways as well, in order to detect intrusion events, and this is indicated by block 390 in the flow diagram of FIG. 4.

When an intrusion event is detected, an indication of the intrusion event is output to confidence level generator 214 and severity level generator 216. It can also be simultaneously or sequentially output to privacy protection action identifier 158. The output illustratively identifies the type of intrusion event (e.g., unexpected visual intrusion, unexpected audio intrusion, etc.), as well as the time of the intrusion, the manner in which it was detected (e.g., compared against baseline information, compared against target intruder information, etc.) and the intrusion event indicator can include other items as well. Outputting an indication of the detected intrusion event is indicated by block 392 in the flow diagram of FIG. 4. The confidence level and severity level are then generated and identified as discussed above with respect to FIG. 3.

It can thus be seen that the present description provides a system in which intrusion events can be automatically detected. Privacy protection actions can then be quickly implemented in order to protect the privacy of the user or other people. At the same time, the present system takes into account context information so that intrusion events are not erroneously detected when they should not be. The present description also provides for machine learning so that, based on user interactions, the system can more accurately be activated, detect intrusions, assigned confidence and severity levels, and take desired privacy protection actions.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
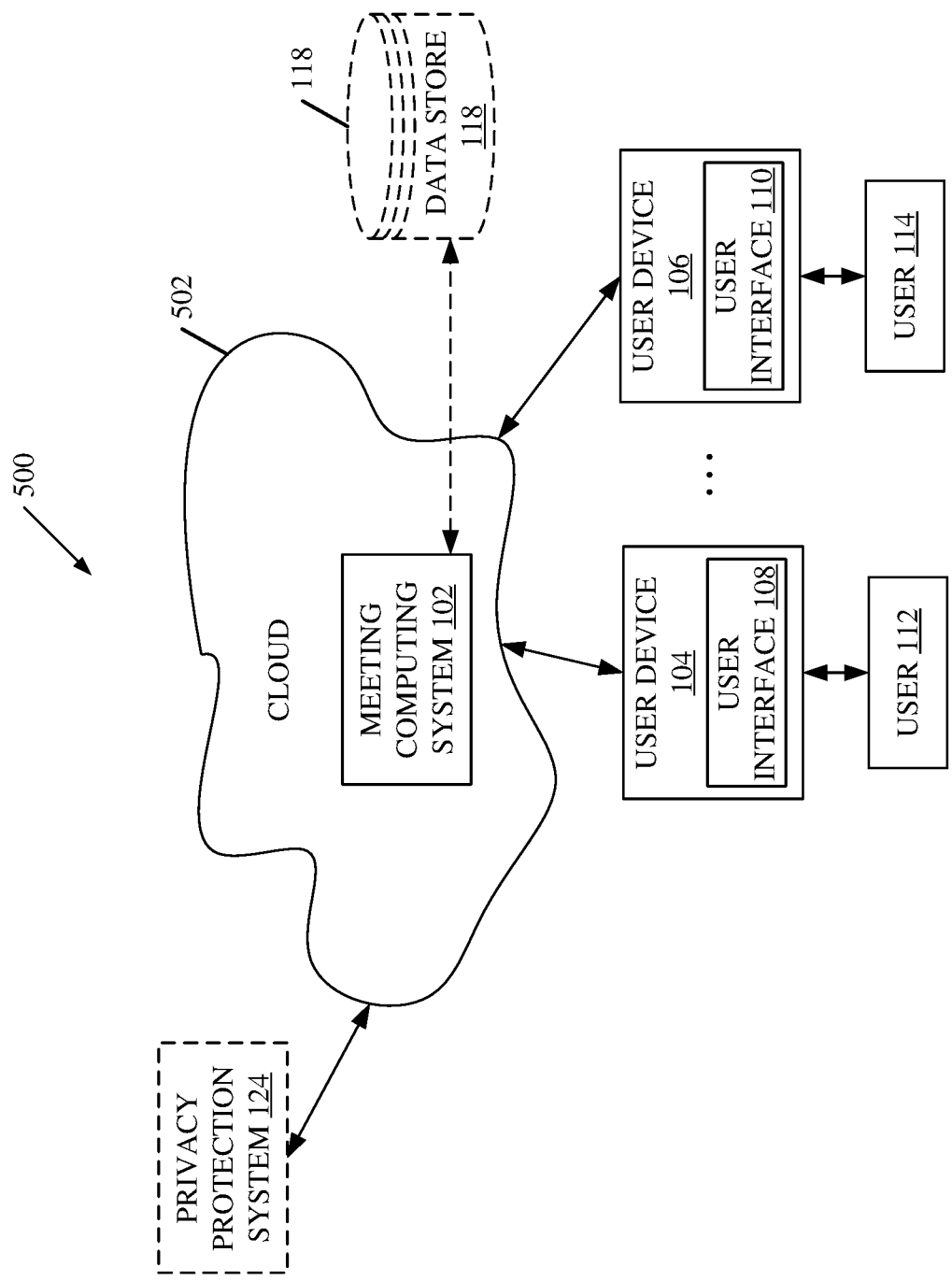
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that meeting computing system 102 can be located in cloud 502 (which can be public, private, or a combination where portions are public while others are private). Therefore, users 112 and 114 use user devices 104 and 106 to access those systems through cloud 502.

FIG. 5 also depicts another example of a cloud architecture. FIG. 5 shows that it is also contemplated that some elements of computing system 102 can be disposed in cloud 502 while others are not. By way of example, data store 118 can be disposed outside of cloud 502, and accessed through cloud 502. In another example, privacy protection system 124 (or other items) can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
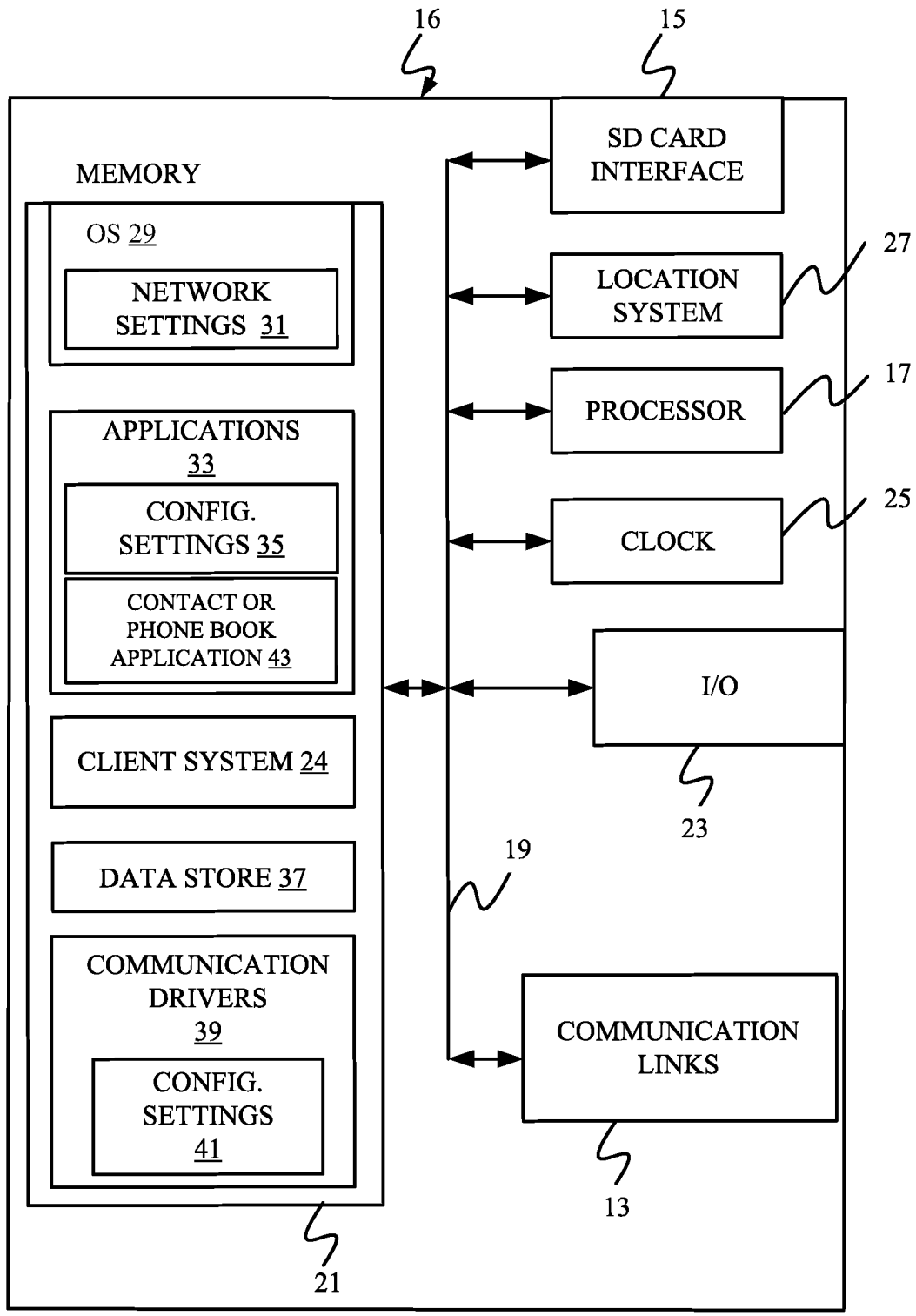
FIGS. 6-8 show examples of mobile devices that can be used in the architectures shown in the previous figures.
Figure 7:
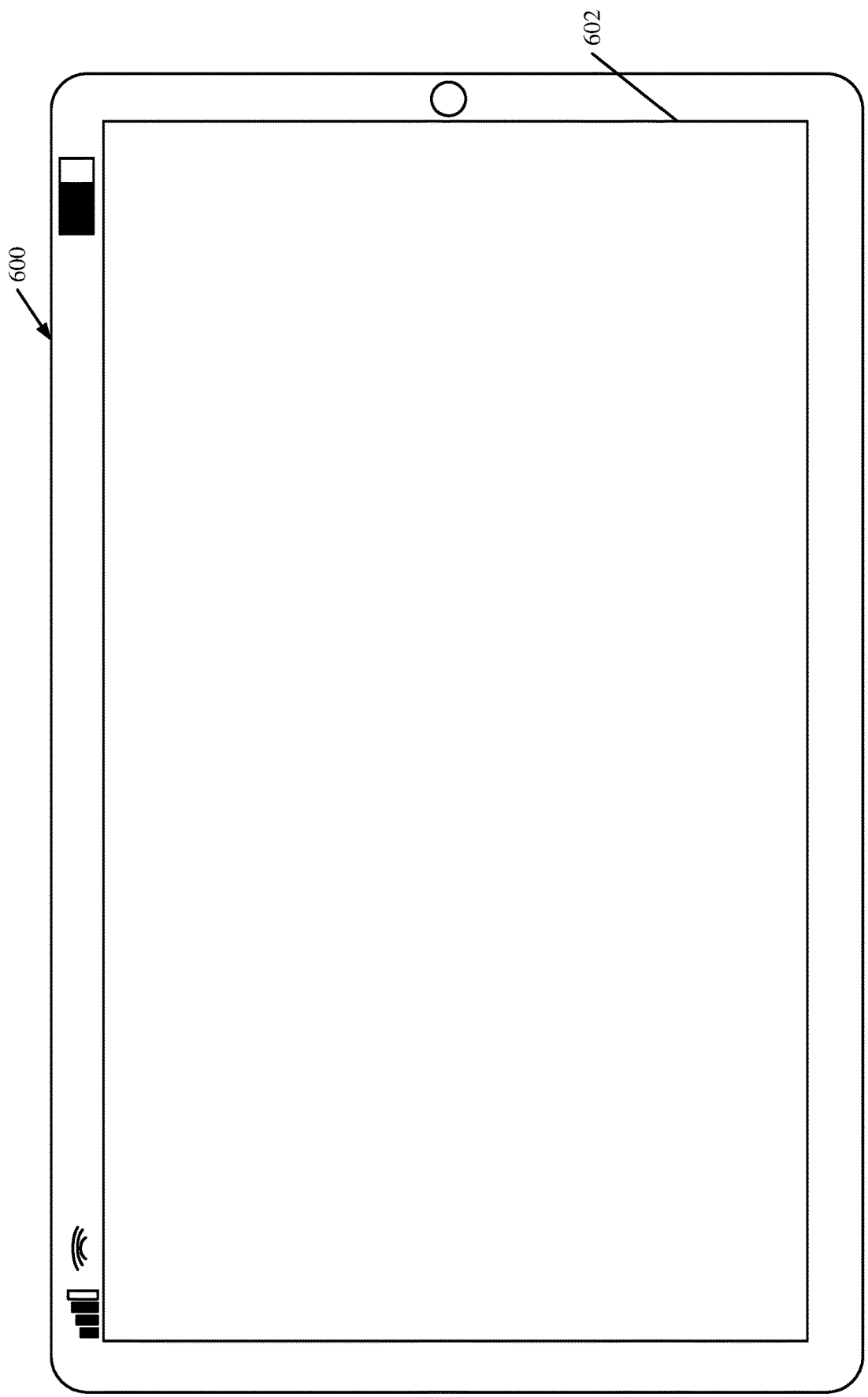
Figure 8:
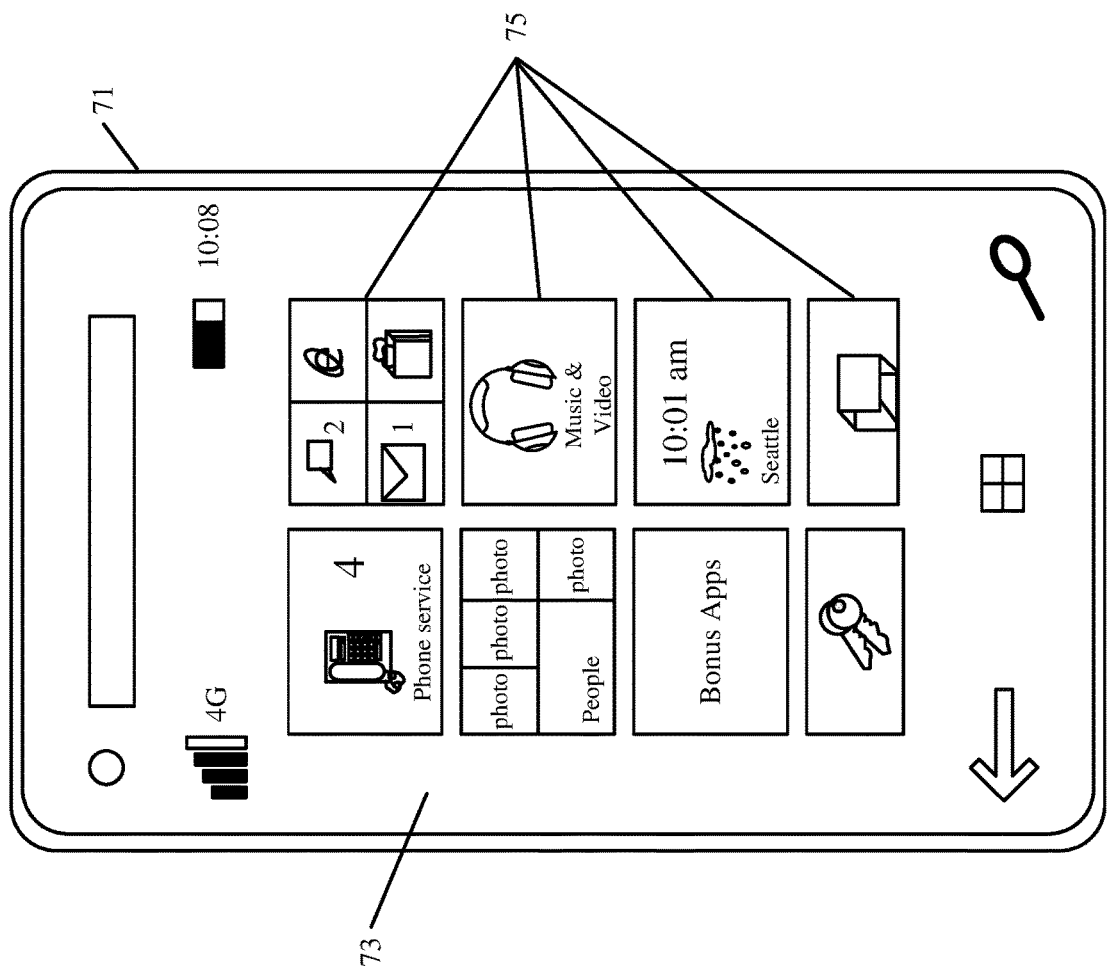

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture or user device 104 or 106 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+and other 3G and 4G and 5G protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
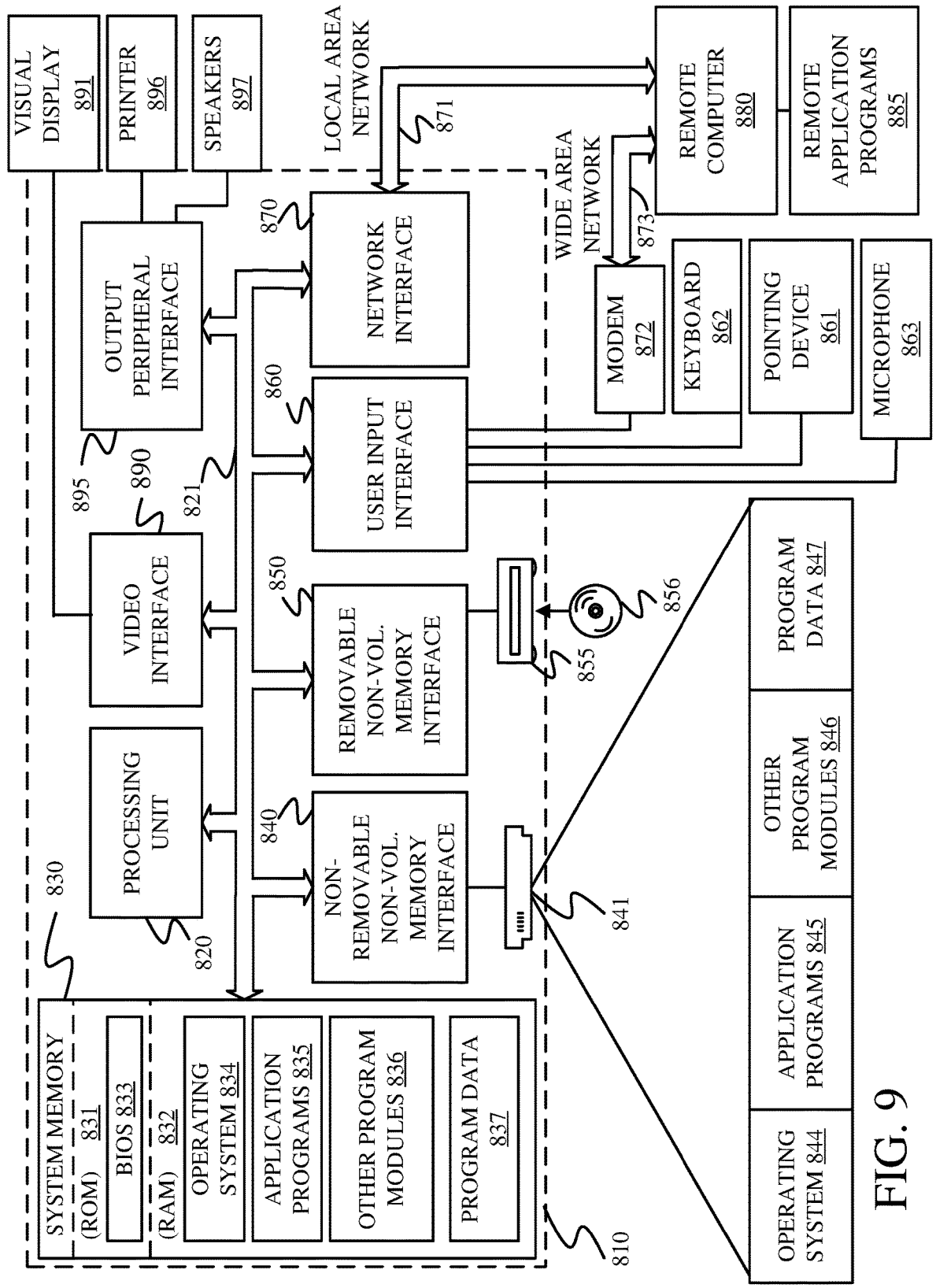
FIG. 9 is a block diagram showing one example of a computing environment which can be used in the environments illustrated in the previous figures.

FIG. 9 is one example of a computing environment in which architecture 100, or parts of it, (for example) can be deployed. With reference to FIG. 9, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:

a privacy protection system that receives meeting visual data indicative of a visual environment of a current meeting that a user is attending using a user device;

a visual intrusion detection system that performs image processing on the meeting visual data to detect a video intrusion event indicative of an unintended object being captured in the meeting visual data and generating a video intrusion event identifier indicative of the detected video intrusion event;

a privacy protection action identifier that identifies a privacy protection action based on the video intrusion event identifier; and a privacy protection action controller that automatically implements a computer system configuration to perform the identified privacy protection action.

Example 2 is the computer system of any or all previous examples wherein the visual intrusion detection system is configured to perform facial recognition on the meeting visual data to detect the video intrusion event.

Example 3 is the computer system of any or all previous examples wherein the visual intrusion detection system is configured to perform body recognition on the meeting visual data to identify movement of a body in the visual environment of the current meeting to detect the video intrusion event.

Example 4 is the computer system of any or all previous examples wherein the privacy protection action controller comprises:

a video action controller that disables transmission of the meeting visual data.

Example 5 is the computer system of any or all previous examples wherein the privacy protection action controller comprises:

a video action controller that processes the meeting visual data to blur a portion of the visual environment of the user.

Example 6 is the computer system of any or all previous examples wherein the privacy protection action controller comprises:

a video action controller that processes the meeting visual data to remove a portion of the visual environment of the user from the meeting visual data.

Example 7 is the computer system of any or all previous examples wherein the user device includes an audio detection component that captures meeting audio data indicative of an audio representation of an environment of the user during the current meeting and wherein the privacy protection system receives the meeting audio data corresponding to the current meeting and further comprising:

an audio intrusion detection system that performs audio processing on the meeting audio data to detect an audio intrusion event indicative of an unintended audible sound being captured in the meeting audio data and to generate an audio intrusion event identifier indicative of the detected intrusion event, the privacy protection action identifier identifying a privacy protection action based on the audio intrusion event identifier.

Example 8 is the computer system of any or all previous examples wherein the privacy protection action controller comprises an audio action controller that disables transmission of the meeting audio data.

Example 9 is the computer system of any or all previous examples wherein the audio detection component comprises a directional audio capture device and wherein the privacy protection action controller comprises an audio action controller that redirects the directional audio capture device.

Example 10 is the computer system of any or all previous examples and further comprising:

a trigger detection system that detects a context of the current meeting and automatically activates the privacy protection system based on the detected context.

Example 11 is the computer system of any or all previous examples wherein the trigger detection system detects, as the context of the current meeting, at least one of a location of the user device during the current meeting, meeting invitees or attendees at the current meeting, a time of the current meeting, or a subject matter of the current meeting.

Example 12 is the computer system of any or all previous examples wherein the intrusion detection system comprises:

a baseline data generation component that obtains baseline meeting data;

a baseline comparison system that compares the meeting visual data indicative of the current meeting to the baseline meeting data to obtain a comparison result; and an intrusion detector that detects the intrusion event based the comparison result.

Example 13 is the computer system of any or all previous examples and further comprising:

a user interaction detector that detects user interaction with the user device after the privacy protection action is performed; and a machine learning system that performs machine learning on the intrusion detection system based on the detected user interaction.

Example 14 is a computer implemented method, comprising:

receiving, at a privacy protection system, meeting audio data indicative of an audible representation of a current meeting that a user is attending using a user device;

performing audio processing on the meeting audio data to detect an audio intrusion event indicative of an unintended audible noise being captured in the meeting audio data;

generating an audio intrusion event identifier indicative of the detected audio intrusion event;

identifying a privacy protection action based on the audio intrusion event identifier; and automatically implementing a computer system configuration to perform the identified privacy protection action.

Example 15 is the computer implemented method of any or all previous examples wherein detecting the intrusion event comprises:

obtaining baseline meeting audio data;

comparing the meeting audio data indicative of the audible representation of the current meeting to the baseline meeting audio data to obtain a comparison result; and detecting the audio intrusion event based the comparison result.

Example 16 is the computer implemented method of any or all previous examples and further comprising:

detecting a context of the current meeting; and automatically activating the privacy protection system based on the detected context.

Example 17 is the computer implemented method of any or all previous examples and further comprising:

detecting user interaction with the user device after the privacy protection action is performed; and performing machine learning on the intrusion detection system based on the user interaction.

Example 18 is the computer implemented method of any or all previous examples and further comprising:

identifying a confidence level corresponding to the detected intrusion event;

identifying a severity level corresponding to the detected intrusion event; and identifying the privacy protection action based on the confidence level and the severity level.

Example 19 is the computer implemented method of any or all previous examples wherein the user device includes a video detection component that captures video data indicative of a video representation of an environment of the user during the current meeting and further comprising:

performing video processing on the video data to detect a video intrusion event indicative of an unintended video image being captured in the video data;

identifying a privacy protection action based on the detected video intrusion event; and automatically implementing a computer system configuration to perform the identified privacy protection action.

Example 20 is a computer implemented method, comprising:

receiving, at a privacy protection system, audio visual meeting data indicative of a current meeting that a user is attending using a user device;

obtaining baseline audio visual meeting data indicative of an environment of the user during the current meeting;

comparing the audio visual meeting data indicative of the current meeting to the baseline audio visual meeting data to obtain a comparison result;

detecting an intrusion event, indicative of unintended audio or visual information being captured in the meeting data, based the comparison result;

generating an intrusion event identifier indicative of the detected intrusion event;

identifying a privacy protection action based on the intrusion event identifier; and automatically implementing a computer system implementation to perform the identified privacy protection action.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
    a privacy protection system configured to receive meeting visual data indicative of a visual environment of a current meeting that a user is attending using a user device;
    a visual intrusion detection system configured to:
        obtain baseline meeting data;
        compare the meeting visual data to indicative of the visual environment of the current meeting to the baseline meeting data;
        obtain a comparison result based on the comparison;
        detect, based on the comparison result, a video intrusion event indicative of an unintended object being captured in the meeting visual data; and
        generate a video intrusion event identifier indicative of the detected video intrusion event;
    a privacy protection action identifier that identifies a privacy protection action based on the video intrusion event identifier; and
    a privacy protection action controller that automatically implements a computer system configuration to perform the identified privacy protection action.

2. The computer system of claim 1 wherein the visual intrusion detection system is configured to perform facial recognition on the meeting visual data to detect the video intrusion event.

3. The computer system of claim 1 wherein the visual intrusion detection system is configured to perform body recognition on the meeting visual data to identify movement of a body in the visual environment of the current meeting to detect the video intrusion event.

4. The computer system of claim 1 wherein the privacy protection action controller comprises:
    a video action controller that disables transmission of the meeting visual data.

5. The computer system of claim 1 wherein the privacy protection action controller comprises:
    a video action controller that processes the meeting visual data to blur a portion of the visual environment of the user.

6. The computer system of claim 1 wherein the privacy protection action controller comprises:
    a video action controller that processes the meeting visual data to remove a portion of the visual environment of the user from the meeting visual data.

7. The computer system of claim 1 wherein the user device includes an audio detection component that captures meeting audio data indicative of an audio representation of an environment of the user during the current meeting and wherein the privacy protection system receives the meeting audio data corresponding to the current meeting and further comprising:
    an audio intrusion detection system that performs audio processing on the meeting audio data to detect an audio intrusion event indicative of an unintended audible sound being captured in the meeting audio data and to generate an audio intrusion event identifier indicative of the detected intrusion event, the privacy protection action identifier identifying a privacy protection action based on the audio intrusion event identifier.

8. The computer system of claim 7 wherein the privacy protection action controller comprises
    an audio action controller that disables transmission of the meeting audio data.

9. The computer system of claim 7 wherein the audio detection component comprises a directional audio capture device and wherein the privacy protection action controller comprises
    an audio action controller that redirects the directional audio capture device.

10. The computer system of claim 1 and further comprising:
    a trigger detection system that detects a context of the current meeting and automatically activates the privacy protection system based on the detected context, wherein the detected context comprises at least one of:
        a location of the user device during the current meeting, meeting invitees or attendees at the current meeting, a time of the current meeting, or a subject matter of the current meeting.

11. The computer system of claim 1, wherein the baseline meeting data represents visual meeting data indicative of a visual environment of a prior meeting, prior to the current meeting.

12. The computer system of claim 11, wherein the baseline meeting data is correlated to a particular meeting context, and wherein the baaseline meeting data is obtained based on the particular meeting context.

13. The computer system of claim 1 and further comprising:
    a user interaction detector that detects user interaction with the user device after the privacy protection action is performed; and
    a machine learning system that performs machine learning on the intrusion detection system based on the detected user interaction.

14. A method performed by an intrusion detection system, the method comprising:
    receiving meeting data representing a current meeting that a user is attending using a user device, wherein the meeting data is indicitive of at least one of:
        an audible representation of the current meeting, or
        a visual environment of the current meeting;
    performing at least one of image processing or audio processing on the meeting data to detect an intrusion event in the meeting data;
    generating an intrusion event identifier indicative of the detected intrusion event;
    identifying a privacy protection action based on the audio intrusion event identifier;
    automatically implementing a computer system configuration to perform the identified privacy protection action;
    detecting user interaction with the user device after the privacy protection action is performed; and
    performing machine learning on the intrusion detection system based on the user interaction.

15. The method of claim 14 wherein detecting the intrusion event comprises:
    obtaining baseline meeting audio data;

comparing the meeting audio data indicative of the audible representation of the current meeting to the baseline meeting audio data to obtain a comparison result; and detecting the audio intrusion event based the comparison result.

16. The method of claim 14 and further comprising:

detecting a context of the current meeting; and automatically activating the privacy protection system based on the detected context.

17. The method of claim 14, wherein the user interaction is indicative of an erroneous intrusion detection, and performing machine learning comprises training an activation trigger detector configured to trigger processing on meeting data to detect intrusion events.

18. The method of claim 14 and further comprising:

identifying a confidence level corresponding to the detected intrusion event;

identifying a severity level corresponding to the detected intrusion event; and identifying the privacy protection action based on the confidence level and the severity level.

19. The method of claim 14 wherein the user device includes a video detection component that captures video data indicative of a video representation of an environment of the user during the current meeting and further comprising:

performing video processing on the video data to detect a video intrusion event indicative of an unintended video image being captured in the video data;

identifying a privacy protection action based on the detected video intrusion event; and automatically implementing a computer system configuration to perform the identified privacy protection action.

20. A computer implemented method, comprising:

receiving, at a privacy protection system, audio visual meeting data indicative of a current meeting that a user is attending using a user device;

obtaining baseline audio visual meeting data indicative of an environment of the user during the current meeting;

comparing the audio visual meeting data indicative of the current meeting to the baseline audio visual meeting data to obtain a comparison result;

detecting an intrusion event, indicative of unintended audio or visual information being captured in the meeting data, based the comparison result;

generating an intrusion event identifier indicative of the detected intrusion event;

identifying a privacy protection action based on the intrusion event identifier; and automatically implementing a computer system implementation to perform the identified privacy protection action.

* * * * *